United States Patent
Payne et al.

(10) Patent No.: US 7,053,925 B2
(45) Date of Patent: May 30, 2006

(54) COMPUTATION TIME REDUCTION FOR THE THREE-DIMENSIONAL DISPLAYS

(75) Inventors: Douglas A Payne, Malvern (GB); Paul M Blanchard, Royston (GB)

(73) Assignee: QinetiQ Limited, London (GB)

( * ) Notice: Subject to any disclaimer, the term of this patent is extended or adjusted under 35 U.S.C. 154(b) by 449 days.

(21) Appl. No.: 10/297,487

(22) PCT Filed: May 24, 2001

(86) PCT No.: PCT/GB01/02302

§ 371 (c)(1),
(2), (4) Date: Dec. 20, 2002

(87) PCT Pub. No.: WO01/95016

PCT Pub. Date: Dec. 13, 2001

(65) Prior Publication Data

US 2004/0021768 A1 Feb. 5, 2004

(30) Foreign Application Priority Data

Jun. 9, 2000 (GB) .................................. 0013942.8

(51) Int. Cl.
*H04N 13/00* (2006.01)
*H04N 15/00* (2006.01)
(52) U.S. Cl. ........................................................ 348/42
(58) Field of Classification Search .................. 348/42, 348/40, 51, 52, 58 P; 345/420; 359/402, 359/466; 395/125, 154; H04N 13/04, 15/00
See application file for complete search history.

(56) References Cited

U.S. PATENT DOCUMENTS

| 5,052,765 | A | * | 10/1991 | Moss et al. | ..................... | 359/9 |
| 5,495,576 | A | * | 2/1996 | Ritchey | ..................... | 345/420 |
| 5,673,151 | A | * | 9/1997 | Rallison | ..................... | 359/631 |
| 5,701,132 | A | * | 12/1997 | Kollin et al. | ................... | 345/8 |
| 5,781,229 | A | * | 7/1998 | Zediker et al. | ............... | 348/51 |
| 6,157,402 | A | * | 12/2000 | Torgeson | ..................... | 348/59 |
| 6,525,478 | B1 | * | 2/2003 | Schmitt et al. | ................ | 315/82 |

FOREIGN PATENT DOCUMENTS

| EP | 0 721 131 A | 7/1996 |
| JP | 08 111877 A | 4/1996 |
| JP | 08 167048 A | 6/1996 |

* cited by examiner

*Primary Examiner*—Nhon Diep
(74) *Attorney, Agent, or Firm*—Nixon & Vanderhye P.C.

(57) ABSTRACT

A reconfigurable, three-dimensional display (1) wherein knowledge of the viewer's (4) eyes is used to enable the effective exit pupil(s) of the display system to be optimised. The system utilises this knowledge to identify contributing regions (5) within the display (1) that contribute light to the viewer (4). Priority is given to calculating and displaying the part of the display corresponding to the contributing region (5), thereby allowing the system computation requirements to be minimised. Further computation savings are achievable by recognising that only light travelling in a limited range of angles need to be considered.

26 Claims, 3 Drawing Sheets

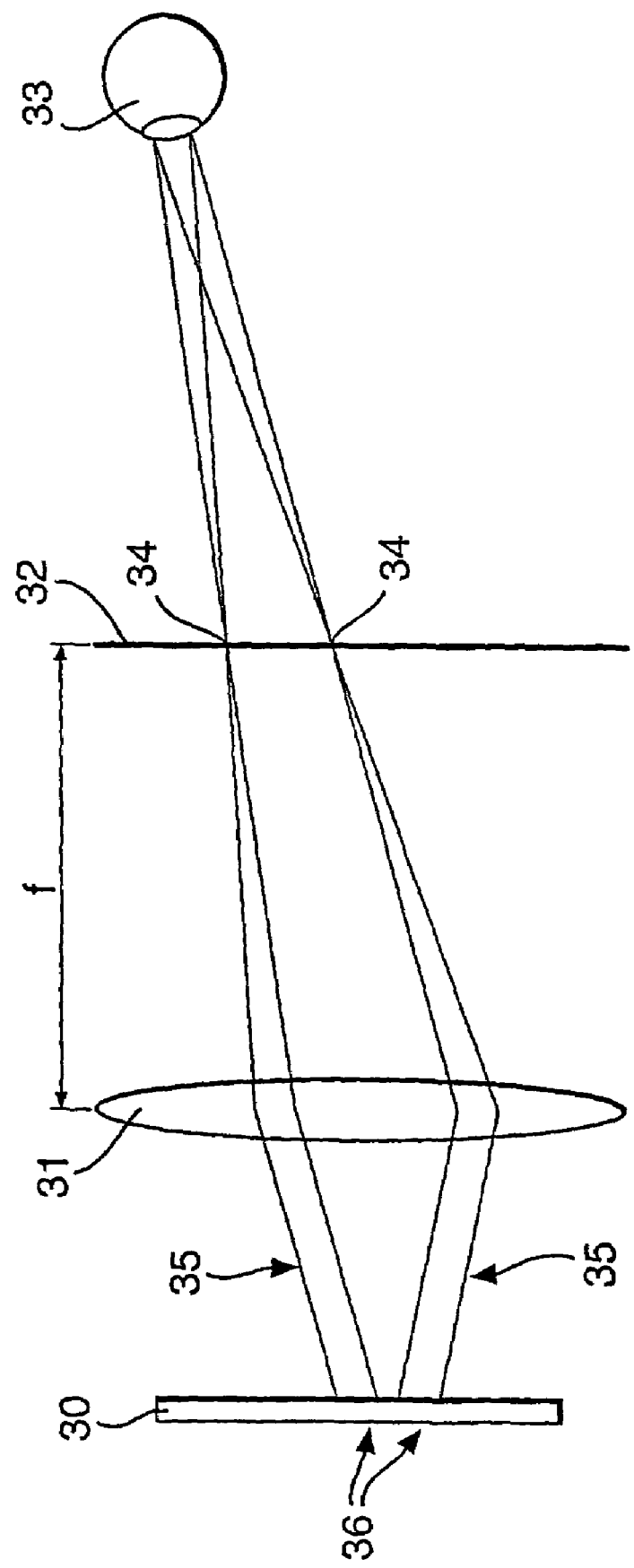

COMPUTATION TIME REDUCTION FOR THE THREE-DIMENSIONAL DISPLAYS

This application is the US national phase of international application PCT/GB01/02302, filed in English on 24 May 2001, which designated the US. PCT/GB01/02302 claims priority to GB Application No. 0013942.8 filed 9 Jun. 2000. The entire contents of these applications are incorporated herein by reference.

The present invention relates to reconfigurable three-dimensional displays and particularly to displays utilising Computer Generated Holograms (CGH). The invention provides a means of minimising the computation time required to generate a Computer Generated Hologram (CGH).

There is significant interest in producing reconfigurable three-dimensional displays for use in applications such as interactive design, medical imaging and scientific visualisation. For some applications it is desirable that the display can be viewed without any special glasses and by multiple viewers and that the image contains as many of the three-dimensional depth cues as possible. Display methods with these attributes include Computer Generated Holograms (CGH) and auto-stereo systems incorporating lenticular lens sheets or microlens arrays. These methods typically make use of a two-dimensional pixelated display device (transmissive or reflective) such as a liquid crystal display in which the amplitude and/or phase of each pixel (picture element) is used to encode the required pixel value. The pixel values are calculated such that when the device is appropriately illuminated and suitable replay optics are used, a three-dimensional image of a simulated object is obtained. Alternatively, the liquid crystal display may be replaced by a non-pixelated spatial light modulator such as an acousto-optic modulator. In this configuration small regions within the spatial light modulator (SLM) perform the same function as the individual pixels in the liquid crystal display.

Despite advances in computer technology and optical modulation techniques, the generation of near real-time, reconfigurable, high quality, three-dimensional images continues to present major technical challenges. For example, reconfigurable display devices for three-dimensional images remain complex and in the case of CGHs computationally intensive, placing heavy processing demands on underlying computer systems.

For a display system based on a CGH, the complexity of the display device, in terms of the number of constituent picture elements or pixels required, is determined both by the required image size and angle of view (the angle over which the image can be seen by a viewer). Particularly for multi-viewer systems, which tend to need large viewing angles, this results in a need for large numbers of pixels. (e.g. $10^{12}$ pixels for a workstation application) and hence very complex display devices. In terms of displaying Computer Generated Holograms, the computation of the pixel values for such a large number of pixels in real-time or even at an interactive rate is also a major challenge, as is the method of transferring data to the display.

In parallel with the aforementioned advances in computer technology, several techniques have been developed for reducing the full system requirements of the display system in an attempt to produce a viable reconfigurable three-dimensional display.

One conventional technique for reducing the requirements of the display system is to incorporate moveable exit pupil(s) within the system. The exit pupil is a region through which all light rays that can be traced all the way through an optical system must pass and is a familiar concept to the skilled person working in the field of optics. In a conventional optical system the exit pupil would typically be a physical aperture or an image of a physical aperture.

A. Schwartze, "Head tracking stereoscopic display", IEEE International Display Research Conference, 1985 describes a stereoscopic display system which presents two two-dimensional perspectives to the viewer. The system uses two CRT projection modules in conjunction with a simple head position sensor and electromechanically controlled moveable exit pupils. The viewer's head is tracked to ensure the exit pupil for the appropriate view is located over the correct eye. The system accommodates lateral movements made by the observer and allows the user to view a stereoscopic presentation without using special glasses.

Since the system senses the lateral position of the observer relative to the display, it is possible to generate and display different stereoscopic views according to observer position, thus producing the look-around effect of a real object. The full system requirements are therefore reduced since the system is not required to simultaneously produce images for all possible viewing angles, only the images which correspond to the observer's particular lateral position. Thus the computational requirement for the system is also reduced.

Fukaya et. al. ["Eye-position tracking type electro-holographic display using liquid crystal devices", N. Fukaya, T. Honda, K. Maeno and K. Sato, Proceedings of EOS Topical meeting on Diffractive Optics, 1997] describe an electro-holographic display system incorporating eye-position tracking.

In the system proposed by Fukaya et. al., two small LCDs display computer generated holograms. Being small, the three-dimensional image from each liquid crystal display has only a small exit pupil (small field-of-view). The LCDs are positioned relative to each other such that their exit pupils coincide with each of the observer's eyes. A scanning mirror is used to ensure the exit pupils follow the observer's eyes during lateral movements. The computed CGH contains far more pixels than the display modulator can support, and essentially only the part of this data required by the observer is put on the modulator, dictated by the observer's head position. By displaying only part of CGH, the full system requirements are again reduced.

The computational load on the underlying processing system for both of these displays is relatively low, however, both techniques suffer from several inherent disadvantages.

Firstly, in both of the aforementioned systems the exit pupil(s) is scanned by mechanical means to follow the viewer's position. The complexity of the display system is thereby increased over a conventional CRT or LCD display. Furthermore, a disquieting time lag may be introduced due to the tracking control system.

Secondly, the shape and size of the exit pupil(s) for the above systems are limited and only the lateral positions of the exit pupil(s) can be controlled. Furthermore, the displays, as described, are restricted to single observers and are incapable of producing an enlarged exit pupil (field-of-view) to cater for multiple viewers or to reduce any lag in image appearance when the viewer makes rapid head movements.

These two techniques essentially use a low pixel count display devices (with relatively low computational requirements) and increase the field of view through mechanical scanning. The present invention relates to using a high pixel count display with a large field of view that doesn't suffer from the above disadvantages. Such displays would normally have high computational requirements. It is an object of the present invention to enable these requirements to be significantly reduced.

In order to clarify the significance of the exit pupil in such 3D displays the following analogy is provided. Consider viewing an object a short distance behind a window in an opaque screen. The range of positions from which the object can be seen (e.g. to look around its sides) is limited by the size of the window. In the display system under consideration the exit pupil defines the 'window' in this analogy and the image provided by the display is the 'object'. An interpretation of the two previously described display systems is that the 'window', or exit pupil, is moved to always be in line with the observer and the 'object', or image.

For a given observer position, the 'window' can be smaller (without clipping the observer's view of the object) the closer it is to the observer. The present invention can be considered equivalent to enabling the display to produce an image that can only be seen through such a small, adaptable 'window'. Just as a 'large window' (determined by the optics in the system) through which an image can be seen from a wide range of viewing positions is properly termed the 'exit pupil', we introduce the term 'effective exit pupil' to represent the additional small, adaptable 'window'. The present invention enables a small effective exit pupil to be positioned near to the viewer(s). The effective exit pupil is 'moved' to follow viewer(s) such that the image can be seen from the same range of viewing positions that the exit pupil would allow. This is achieved by appropriate calculation of the display pixel values. The viewers eye positions need to be obtained using some form of head tracking device.

It will be shown that the computation time required to calculate the pixel values in the display is reduced as the size of the above effective exit pupil is reduced.

Unlike the movable exit pupils of the previous examples, the positioning of the effective exit pupil(s) requires no moving parts in the system of the present invention, potentially reducing costs and increasing reliability. Further, the system of the present invention allows the effective exit pupil(s) to be of arbitrary shape and arbitrarily positioned in all three dimensions, improving ease of use. Multiple viewers are also catered for with the present system.

Additionaly, the present invention allows the effective exit pupil(s) or field-of-view of the system to be enlarged when no changes occur in the image. This has the potential to allow the elimination of lag in image appearance that may occur when the user makes rapid head movements.

According to the present invention apparatus for producing a three-dimensional image comprises;

a display means capable of producing a three dimensional image which is capable of being viewed from a range of viewing positions, a monitoring means for obtaining information about the at least one observer, and control means responsive to the monitoring means for controlling the display means, characterised in that the display means comprises a plurality of addressable sub-regions controlled by the control means such that priority is given to producing a complete image for the at least one determined viewing position.

The apparatus provides a viable display by giving priority to only those parts of the image that may be seen by the at least one observer at the at least one determined viewing position. This enables a reduction in the time required to compute the pixel values in the display means thus allowing the image to be updated at a higher frequency. Since no moving parts are introduced, the apparatus remains cost-effective and reliability is enhanced.

The eye positions and pupil sizes of the viewer's eyes are required by the control means for the purpose of identifying the contributing regions in the display means. The eye positions should be obtained by the monitoring means. The pupil sizes may be obtained by the monitoring means or may be assumed to be a typical value such as 4 mm diameter.

Preferably the viewing positions of two or more observers may be determined and priority given to producing a complete image for each of the determined viewing positions. Multiple observers are therefore catered for by the present apparatus.

In a preferred embodiment the control means identifies at least one contributing region, comprising addressable sub-regions of the display means, that contributes to the image formed for the at least one viewing position and gives priority to calculating pixel values of the display means for said at least one contributing region. Parts of the image seen by the observer may be generated by separate areas within the contributing region, whilst separate contributing regions within the display-means may be envisaged for multiple viewers.

In a further preferred embodiment the control means gives priority to calculating pixel values for each of the sub-regions of the display means that comprise substantially the centre of the at least one said contributing region. This is advantageous in that the image appears to be built up from its centre.

In another embodiment the apparatus further comprises means for determining the position of ocular fixation within the display means of the at least one observer. In this embodiment the control means gives priority to calculating pixel values for each of the sub-regions of the display means that contribute substantially to the image at the position of ocular fixation of the at least one observer.

For the purposes of this specification, the position of ocular fixation within the display means shall be defined as the observer's point of fixation on the image. The technique of monitoring an observers point of fixation on an image is commonly known as gaze-tracking and is equivalent to detecting the position of the fovea of the observer's eyes. The information relating to the observer's point of fixation on the image is used advantageously to cause the image to be built up from the point of interest.

In a further preferred embodiment the control means gives priority to calculating pixel values for each of the sub-regions of the display means that correspond substantially to parts of the image that are changing. This approach increases the rate of interaction between an observer and the image being displayed. Usability of the apparatus is generally enhanced by according priority to parts of the image that are changing.

In another embodiment the control means determines the range of angles that sub-regions of the display means must direct light into to contribute to the image formed for the at least one viewing position and the pixel values of the display means are calculated such that priority is given to directing light into said range of angles.

In a further preferred embodiment the control means controls the display means such that the effective exit pupil of the apparatus is optimised for the at least one viewer.

The effective exit pupil of the apparatus is a region through which all the light rays considered in the calculation of the pixel values will pass. The apparatus capitalises on the fact that no image degradation will be perceived provided the observer's eye pupils are located within the effective exit pupil of the display apparatus.

Advantageously the time required to calculate and display the image may be minimised by optimising the effective exit pupil of the apparatus to coincide with the pupils of the observer's eyes. The apparatus allows the effective exit pupil to be of arbitrary shape and size and to be arbitrarily positioned in all three-dimensions. Hence, the apparatus exhibits a high degree of flexibility, allowing the shape, size and position of the effective exit pupil be adjusted.

The effective exit pupil over which the complete image is viewable may be enlarged during periods when the image is substantially unchanging. This allows the observer to make rapid head movements without perceiving any lag in image replay.

The display means may comprise a spatial light modulator (SLM) means and the control means may be used to calculate the modulation required in the sub-regions of the spatial light modulator means.

In a further preferred embodiment the monitoring means collects information relating to the eyes of the at least one observer and the control means uses said information to adapt the effective exit pupil of the apparatus to match the eyes of the at least one observer.

In a particular embodiment the addressable sub-regions of the display means display a computer generated hologram.

According to a second aspect of the present invention, a method of minimising the time required to display a reconfigurable three-dimensional image using a display means comprising a plurality of addressable sub-regions, capable of producing a three dimensional image which is capable of being viewed from a range of viewing positions, a monitoring means for determining the viewing position of at least one observer, and control means responsive to the monitoring means for controlling the display means, characterised by the steps of determining the viewing position of the at least one observer and prioritising the control of the addressable sub-regions within the display means to produce a complete image for the at least one determined viewing position.

Preferably the viewing positions of two or more observers may be determined and the control of the addressable sub-regions within the display means prioritised to produce a complete image for the two or more determined viewing positions.

In a preferred embodiment at least one contributing region is identified, comprising addressable sub-regions of the display means, that contributes to the image formed for the at least one viewing position and priority is given to calculating pixel values for the sub-regions within the display means that comprise substantially the at least one said contributing region.

In a further preferred embodiment priority is given to calculating pixel values for each of the sub-regions of the display means that comprise substantially the centre of the at least one said contributing region.

In another embodiment the method further comprises the steps of determining the position of ocular fixation within the display means of the at least one observer and giving priority to calculating pixel values for each of the sub-regions of the display means that contribute substantially to the image at the position of ocular fixation of the at least one observer.

In a further embodiment priority is given to calculating pixel values for each of the sub-regions of the display means that correspond substantially to parts of the image that are changing.

In a another embodiment the method further comprises the steps of determining the range of angles that sub-regions of the display means must direct light into to contribute substantially to the image formed for the at least one viewing position and calculating the pixel values of the display means such that priority is given to directing light into substantially said range of angles.

In a another embodiment the method further comprises the step of controlling the display means such that the effective exit pupil of the apparatus is optimised for the at least one viewer.

Preferably the step of enlarging the effective exit pupil over which the complete image is viewable may be incorporated during periods when the image is substantially unchanging.

In one embodiment the display means comprises a spatial light modulator (SLM) means and the control means calculates the modulation required in the sub-regions of the spatial light modulator means.

In a further preferred embodiment the monitoring means collects information relating to the eyes of the at least one observer and the control means uses said information to adapt the effective exit pupil of the apparatus to match the eyes of the at least one observer.

In a particular embodiment the addressable sub-regions of the display means display a computer generated hologram.

The invention will now be described, by example only, with reference to the accompanying drawings in which;

FIG. 3 illustrates a schematic cross-section of a CGH display showing how collimated beams arising from the CGH give rise to points in the focal plane of the replay optics.

Figure 1:
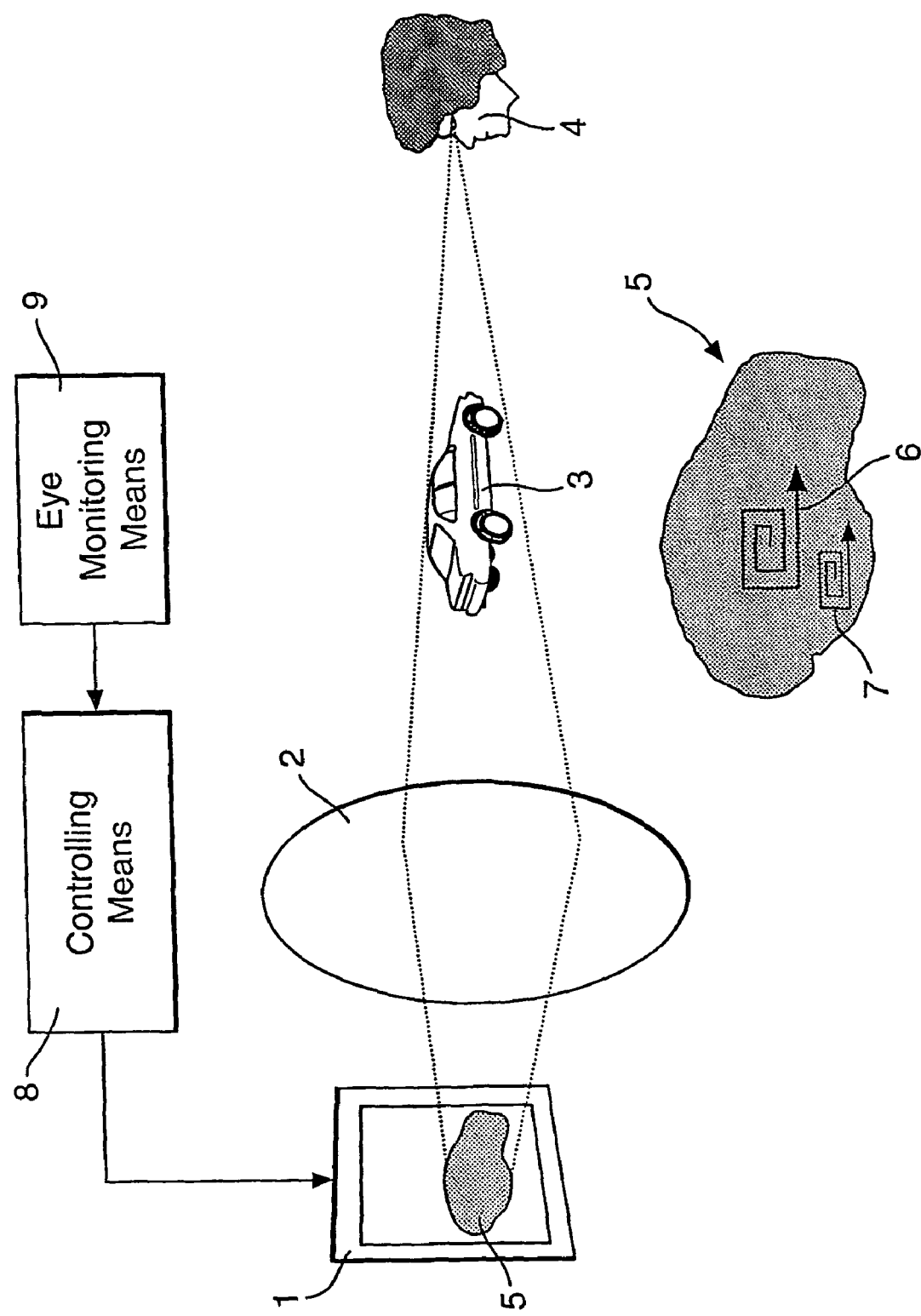
FIG. 1 shows a schematic representation of a reconfigurable three-dimensional display system illustrating how only a small region of the display contributes light to the three-dimensional image that reaches the viewer's eyes.

Conventional autostereoscopic and holographic three-dimensional displays contain far more information than a single viewer requires because the display simultaneously provides views for every potential viewing position, whether a viewer is there or not. Such displays have very large numbers of pixels, placing significant demands on the computation system used to calculate their values.

The full system requirements for a such a reconfigurable three-dimensional display may therefore be reduced by calculating only the pixel values in the display device required to provide a three-dimensional image to a particular viewer, by making use of knowledge of the viewer's eye positions. This knowledge can be obtained using head/eye tracking systems that have previously been demonstrated.

The present invention uses the knowledge of the viewer's eye positions to enable an effective exit pupil(s) of the display system to be optimised. The system simultaneously controls the shape, size and position of the effective exit pupil(s) of the display so as to coincide with the viewer's eye pupils. However, unlike some display systems which use electromechanical means to move an exit pupil to follow the viewer's eyes, the present invention relies purely on calculating the appropriate pixel transmission values in the display device to control the effective exit pupil of the system.

No moving parts are introduced into the system, providing a cost effective solution and maintaining reliability. Moreover, since the effective exit pupil of the system is 'moveable' by recomputing the display pixel values, there is no mechanical inertia in the display system to overcome. Accordingly, the system enables the effective exit pupil of the display to be rapidly repositioned both laterally and vertically in sympathy with the movements of the viewer.

The display system exhibits a high degree of flexibility and may be adapted in real time to cater for multiple concurrent viewers by altering the shape, size and position of the effective exit pupil(s) of the system.

Although the concept of controlling the effective exit pupil(s) of the system provides a concise way of explaining the present invention, the means by which the invention could be practically implemented would involve identifying contributing regions in the display and the angles into which those regions need to contribute light. Hence the following discussion describes the invention from this perspective.

The present invention utilises the fact that for a given viewer location, only a small region of the display contributes light to the image seen, known as 'the contributing region'. Calculation and population of the pixels within this region alone will provide the viewer with a three-dimensional image of the same quality as if all of the pixels were populated. To take account of the viewer's two eyes, or the additional eyes of multiple viewers, multiple 'contributing regions' could be utilised.

For the purpose of the of the following discussion the display shall be described in terms of Computer Generated Hologram (CGH) based systems although the principle is also applicable to other display systems. Furthermore, descriptions of display devices in terms of two-dimensional pixelated liquid crystal displays (transmissive or reflective) are illustrative and are not meant to be limiting. For example, a liquid crystal display may be replaced by a non-pixelated spatial light modulator such as an acousto-optic modulator. In this configuration small regions within the spatial light modulator (SLM) perform the same function as the individual pixels in the liquid crystal display.

For clarity, the following embodiments have been described in terms of a single viewer, although in practice the technique is applicable to three-dimensional displays with multiple viewers.

Referring to FIG. 1, light passes through the CGH (1) and the replay optics (2) to form the three-dimensional image (3). Only a small proportion of this light will pass through the viewer's eye pupils (4), determined by the eye monitoring means (9). This light comes from the contributing region (5) and priority would be given within the controlling means (8) to calculating these pixels within the contributing region first.

The monitoring means (9) monitors the position of the viewer with respect to the CGH (1) and provides position data (for example the co-ordinates of the viewer in x, y and z axes) to the control means (8). The monitoring means (9) may also be used to obtain supplementary information regarding the eye positions and pupil sizes of the viewer's eyes. Furthermore, the viewer's point of fixation on the image produced by the CGH (1) may also be determined by the monitoring means (9). This is equivalent to detecting the position of the fovea of the viewer's eyes. For the purposes of this specification the viewer's point of fixation shall also be referred to as the point of ocular fixation.

The above mentioned supplementary information is communicated to the control means (8) and is used by the control means (8) to determine the optimum contributing region.

The control means (8) utilises the position data from the monitoring means (9) in conjunction with parameters relating to the display system (for example the size and configuration of the display element and optical components within the system) to calculate pixel values for the CGH (1). The control means (8) may include computing means to calculate the pixel values for the CGH (1).

The pixel values calculated by the control means (8) govern the amplitude and/or phase of each pixel within the CGH (1) such that when the CGH (1) is appropriately illuminated, a three-dimensional image (3) is produced by the relay optics (2).

The computational requirement for the above system is reduced since only the pixels within the contributing region need to be calculated in order to present an image to the viewer. However, the image quality remains the same as if all of the pixels in the three-dimensional display were populated. Since the number of pixels within the contributing region is less than the number of pixels in the full display, the time required to calculate and display the image is correspondingly reduced.

The above computational savings may be offset against other system parameters to allow other system functions to be improved; for example enabling the displayed image to be updated at a faster rate, thereby enhancing interaction between the viewer and the display system.

Calculation of the pixel values within the contributing region (5) can be further prioritised such that the most important pixels within the contributing region (5) are calculated first. This will reduce the time taken to present the viewer with an acceptable image. Two approaches are proposed to identify the pixels of most importance.

Firstly, the pixels in the centre (6) of the contributing region (5) may be calculated first. This will cause the image to be built up from the centre (6) of the contributing region.

Alternatively, in addition to knowledge of the viewers eye positions, the viewer's point of ocular fixation on the image may also be measured. This is commonly known as gaze tracking and is equivalent to detecting the position of the fovea of the viewer's eyes. Priority may therefore be given to calculating the pixels that correspond to the viewers point of fixation on the image (7). This will cause the image to be built up from the point of interest (7) within the contributing region (5).

It is envisaged that calculation of pixels outside of the contributing region will be carried out when the image is unchanging, effectively 'filling out' the range of potential viewing positions and thus allowing rapid head or viewer motion with no lag in image appearance.

Figure 2:
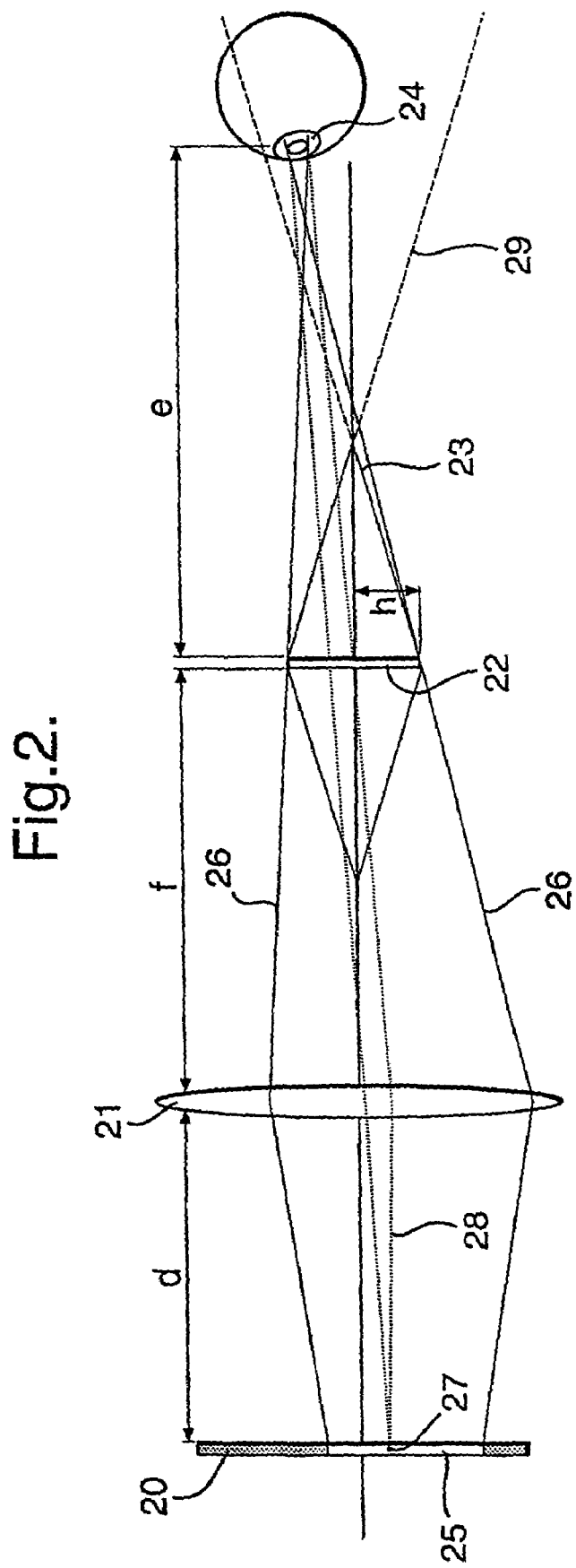
FIG. 2 illustrates a schematic cross-section of a CGH display showing how ray tracing may be used to determine the limited range of angles that each pixel in the CGH contributes light into that reaches the viewer's eyes.

A second level of computational saving is also proposed, which will still provide the viewer with a three-dimensional image of the same quality as if all of the pixels were populated. This is achieved by considering the limited range of angles that pixels within the contributing regions need to direct light into. FIG. 2 shows how these restricted angular ranges may be identified by tracing rays from the CGH, through the replay optics and three-dimensional image and finally through the pupils of the viewer's eyes.

FIG. 2 shows a cross-section of a schematic of a CGH based display system. Light passes through the CGH (20), the replay optics (21) and forms the three-dimensional image around the focal plane (22). The three-dimensional image will typically be contained within a diamond shaped (polyhedral in three-dimensions) volume (23). An eye with a pupil is shown (24). Only light arising from the contributing region (25) reaches the eye pupil. The extremities of the contributing region are defined by the intersections of the light rays (26) that pass through the extremities of the image and the eye pupil. It can be seen that only a limited angular cone of light (28) arising from a single pixel (27) in the CGH reaches the eye pupil. Another feature of CGH based displays is the viewing region, the bounds of which are shown by dashed lines (29). This is the region in which the eye needs to be located in order to see the whole image.

To illustrate how the method may be used to achieve computational savings, consider the design of a CGH using the 'Coherent Ray Trace' method.

The desired three-dimensional object would be defined mathematically, perhaps with computer aided design software. Its surface would be uniformly sampled at a number of points. Light rays would be traced from every one of these points to every pixel in the CGH. The required transmission of each CGH pixel is calculated from the coherent addition of all these light rays.

If the viewer's eye positions and pupil sizes are known then only those rays that could be extrapolated back to the eye pupils would need to be traced. This enables the number of rays that need to be traced to be reduced, thus saving computation time.

If only the viewers eye positions are known, then some sensible value for the pupil size may be assumed e.g. a diameter of 4 mm. Using a larger value for the pupil size in the CGH calculation will make the system more tolerant of eye position measurement errors although at the cost of increased computation time.

A rule-of-thumb formula can be derived to estimate the computation savings expected:

If the eye is within the viewing region (29) it can be shown that all light rays from the three-dimensional image that reach the pupil either pass through the focal plane within the image volume or could be extrapolated back to it. Thus, to a good approximation, the maximum number of ray traces will be required for an image that consists of points filling the entire focal plane.

It is very convenient to use this image as points in the focal plane of the replay optics arise from collimated beams from the CGH. FIG. 3 illustrates this phenomenon. As before, light rays can be traced from the CGH (30), through the replay optics (31) to the viewer's eye pupil (33). Rays passing through the same point (34) In the focal plane (32) can be shown to intersect the CGH at the same angle over a small area (36) of the CGH. Thus each point in the focal plane corresponds to a collimated beam (35) at a different angle in the region between the CGH and replay optics. The area on the CGH (and thus the number of CGH pixels within it) that contributes light at a particular angle is proportional to the area of the eye pupil and is independent of the distance of the CGH from the optics, although its position will vary. This area is approximately the same for all 'angles' of the light rays considered. Since the focal plane is completely filled it can be said that an area of the CGH equivalent to this area directs light into all these angles.

Thus, using a CGH that is designed to direct light into all angles over its whole area as a baseline, simple geometrical arguments show that the reduction, R, in the number of 'traces' is $$R \approx \frac{\text{area of collimated beam}}{\text{area of CGH}} = \frac{\text{area of pupil}}{\text{area of CGH}} \times \left(\frac{f}{e}\right)^2$$

and it is assumed that the pupil is approximately parallel to the lens.

If a CGH based three-dimensional display of a 50×50 cm image with a field of view of ±15°, pupil diameter 4 mm and d=e=f=1 m, then of order $10^4$ times less traces will be needed. If the eye positions are only known approximately then the savings will be less although still useful. For example, where the eye positions are only known to be within a circular region 10 cm in diameter at the above distance, then the reduction in the number of traces would be around 30 times.

Computation savings may also be achieved with other CGH design methods. For example, the diffraction specific method (M. Lucente, "Holographic bandwidth compression using spatial subsampling", Optical Engineering, Vol. 35, No. 6, June 1996). In this case the bandwidth (range of spatial frequencies) of the fringes encoded into each hogel (holographic element) would be determined by the limited range of angles that each hogel is required to direct light into for a given viewer position.

The invention claimed is:

1. Apparatus for producing a three-dimensional image, said apparatus comprising;
    a display means for producing a three dimensional image, said image capable of being viewed from a range of viewing positions, wherein said display means having an exit pupil of a size determined by values assigned to pixels in a plurality of sub-regions of the display;
    a monitoring means for determining a viewing position of at least one observer, and
    control means, responsive to the monitoring means, for controlling the display means, wherein the control means provides computational priority to the determined viewing position by computing pixel values in the sub-regions such that a complete image is first provided for said determined viewing position and, as a consequence, reducing the size of the exit pupil.

2. The apparatus according to claim 1 wherein the viewing positions of two or more observers are determined and wherein priority is given to producing a complete image for each of the determined viewing positions.

3. The apparatus according to claim 1 or 2 wherein the control means identifies at least one contributing region, comprising addressable sub-regions of the display means, that contributes to the image formed for the at least one viewing position and wherein priority is given to calculating pixel values of the display means for said at least one contributing region.

4. The apparatus according to claim 3 wherein the control means gives priority to calculating pixel values for each of the sub-regions of the display means that comprise substantially the centre of the at least one said contributing region.

5. The apparatus according to claim 3 and further comprising means for determining the position of ocular fixation within the display means of the at least one observer and wherein the control means gives priority to calculating pixel values for each of the sub-regions of the display means that contribute substantially to the image at the position of ocular fixation of the at least one observer.

6. The apparatus according to any of the preceding claims wherein the control means gives priority to calculating pixel values for each of the sub-regions of the display means that correspond substantially to parts of the image that are changing.

7. The apparatus according to claim 1, wherein the control means determines the range of angles that sub-regions of the display means must direct light into to contribute to the image formed for the at least one viewing position and wherein priority is given to calculating pixel values of the display means such that light is substantially directed into said range of angles.

8. The apparatus according to claim 1, wherein the control means controls the display means such that the effective exit pupil of the apparatus is optimised for the at least one viewer.

9. The apparatus according to claim 1, wherein the effective exit pupil over which the complete image is viewable is enlarged during periods when the image is substantially unchanging.

10. The apparatus according to claim 1, wherein the display means comprises a spatial light modulator (SLM) means.

11. The apparatus according to claim 10 wherein the control means calculates the modulation required in the sub-regions of the spatial light modulator means.

12. The apparatus according to claim 1, wherein the monitoring means collects information relating to the eyes of the at least one observer and wherein said information is used by the control means to adapt the effective exit pupil of the apparatus to match the eyes of the at least one observer.

13. The apparatus according to claim 1, wherein the addressable sub-regions of the display means display a computer generated hologram.

14. A method of reducing the time required to display a reconfigurable three-dimensional image using a display means comprising a plurality of addressable sub-regions, capable of producing a three dimensional image which is capable of being viewed from a range of viewing positions, a monitoring means for determining the viewing position of at least one observer, and control means responsive to the monitoring means for controlling the display means (1), wherein said method is comprised by the steps of:
  determining the viewing position of the at least one observer; and
  prioritising the control of the addressable sub-regions within the display means to first produce a complete image for the determined viewing position, thereby reducing the initial computation of pixel values.

15. The method according to claim 14 wherein the viewing positions of two or more observers are determined and the control of the addressable sub-regions within the display means is prioritised to produce a complete image for the two or more determined viewing positions.

16. The method according to claims 14 or 15 and further comprising the steps of identifying at least one contributing region, comprising addressable sub-regions of the display means, that contributes to the image formed for the at least one viewing position and giving priority to calculating pixel values for the sub-regions within the display means that comprise substantially the at least one said contributing region.

17. The method according to claim 16 wherein priority is given to calculating pixel values for each of the sub-regions of the display means that comprise substantially the centre of the at least one said contributing region.

18. The method according to claim 16 further comprising the steps of determining the position of ocular fixation within the display means of the at least one observer and giving priority to calculating pixel values for each of the sub-regions of the display means that contribute substantially to the image at the position of ocular fixation of the at least one observer.

19. The method according to claim 14, wherein priority is given to calculating pixel values for each of the sub-regions of the display means that correspond substantially to parts of the image that are changing.

20. The method according to claim 14, further comprising the steps of determining the range of angles that sub-regions of the display means must direct light into to contribute substantially to the image formed for the at least one viewing position and calculating the pixel values of the display means such that priority is given to directing light into substantially said range of angles.

21. The method according to claim 14, further comprising the step of controlling the display means such that the effective exit pupil of the apparatus is optimised for the at least one viewer.

22. The method according to claim 14, further comprising the step of enlarging the effective exit pupil over which the complete image is viewable during periods when the image is substantially unchanging.

23. The method according to claim 14, wherein the display means comprises a spatial light modulator (SLM) means.

24. The method according to claim 23 wherein the control means calculates the modulation required in the sub-regions of the spatial light modulator means.

25. The method according to claim 14, wherein the monitoring means collects information relating to the eyes of the at least one observer and wherein said information is used by the control means to adapt the effective exit pupil of the apparatus to match the eyes of the at least one observer.

26. The method according to claim 14, wherein the addressable sub-regions of the display means display a computer generated hologram.

* * * * *